US010181710B1

(12) United States Patent
Kanamori et al.

(10) Patent No.: US 10,181,710 B1
(45) Date of Patent: Jan. 15, 2019

(54) ELECTRICAL CONNECTION BOX

(71) Applicant: Yazaki Corporation, Tokyo (JP)

(72) Inventors: Takanori Kanamori, Shizuoka (JP); Tatsuya Fukunaga, Shizuoka (JP); Takuomi Wada, Shizuoka (JP); Kenji Segawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/112,795

(22) Filed: Aug. 27, 2018

(30) Foreign Application Priority Data

Aug. 30, 2017 (JP) ................. 2017-165129

(51) Int. Cl.
  *H02G 5/08* (2006.01)
  *H02G 3/08* (2006.01)
  *H01R 25/16* (2006.01)

(52) U.S. Cl.
  CPC ............. *H02G 5/08* (2013.01); *H01R 25/162* (2013.01); *H02G 3/081* (2013.01)

(58) Field of Classification Search
  CPC ........................................ H02G 5/08
  See application file for complete search history.

(56) References Cited

U.S. PATENT DOCUMENTS

| 6,910,923 | B2 * | 6/2005 | Nakanishi | H01H 85/0417 |
| | | | | 439/620.26 |
| 7,332,673 | B2 * | 2/2008 | Shimoda | H01R 9/226 |
| | | | | 174/68.2 |
| 7,364,449 | B2 * | 4/2008 | Makino | H01R 9/226 |
| | | | | 439/212 |
| 7,588,444 | B2 * | 9/2009 | Kataoka | H02K 3/50 |
| | | | | 439/76.2 |
| 8,383,940 | B2 * | 2/2013 | Yoshida | H01R 4/2454 |
| | | | | 174/68.2 |
| 8,449,316 | B2 * | 5/2013 | Chiba | B60Q 3/51 |
| | | | | 439/409 |
| 2001/0039131 | A1 * | 11/2001 | Murakami | H01R 9/226 |
| | | | | 439/76.2 |
| 2005/0026471 | A1 * | 2/2005 | Kobayashi | H01R 9/223 |
| | | | | 439/76.2 |
| 2005/0153583 | A1 * | 7/2005 | Kawamura | H01R 9/2458 |
| | | | | 439/76.2 |

(Continued)

FOREIGN PATENT DOCUMENTS

JP 9-182249 A 7/1997

*Primary Examiner* — Hung V Ngo
(74) *Attorney, Agent, or Firm* — Kenealy Vaidya LLP (57) ABSTRACT

An electrical connection box includes a lower cover, an upper cover, a connector front opening, bus bars, four first ribs formed of two pairs opposing each other with the bus bar, formed on the lower cover, interposed therebetween, and four second ribs formed of two pairs opposing each other with the bus bar, formed on the upper cover, interposed therebetween. The first ribs and the second ribs are provided such that a pair of ribs is provided to oppose each other on one side and on another side with the bus bar interposed therebetween in a vertical direction, and a pair of ribs is provided to oppose each other on one side and on another side with the bus bar interposed therebetween in a width direction. When viewed from a direction of assembling, the first ribs and the second ribs are provided at different positions.

1 Claim, 6 Drawing Sheets

(56) References Cited

U.S. PATENT DOCUMENTS

| | | | |
|---|---|---|---|
| 2011/0080059 A1* | 4/2011 | Ikeda | B60R 16/0238 |
| | | | 307/150 |
| 2012/0064741 A1* | 3/2012 | Kawaguchi | H01R 9/226 |
| | | | 439/76.2 |
| 2014/0273554 A1* | 9/2014 | Sugimoto | B60R 16/0238 |
| | | | 439/76.2 |

* cited by examiner

ELECTRICAL CONNECTION BOX

CROSS-REFERENCE TO RELATED APPLICATION(S)

The present application claims priority to and incorporates by reference the entire contents of Japanese Patent Application No. 2017-165129 filed in Japan on Aug. 30, 2017.

BACKGROUND OF THE INVENTION

1. Field of the Invention

The present invention relates to an electrical connection box.

2. Description of the Related Art

Conventionally, an electrical connection box (also referred to as a junction box, a fuse box, a relay box, or the like), which is mounted on a vehicle such as an automobile and collectively accommodates connection processing components such as a wire harness and electronic components such as a fuse, a relay, and an electronic control unit, has been known.

Japanese Patent Application Laid-open No. H9-182249 proposes a technique in which a plurality of bus bars are attached to an insulating plate and a bus bar pressing cover is placed on a part of an upper surface of the uppermost bus bar to position the bus bars with respect to the insulating plate.

As a method for positioning the bus bar, there are methods of performing positioning of a bus bar with respect to a lower cover on a lower side and an upper cover on an upper side of an electrical connection box by insert-molding or dividing the bus bar other than using an additional member such as the above-described bus bar pressing cover. However, it is difficult to achieve cost reduction through space saving or simplification of a die with such methods for positioning the bus bar, and thus, there is room for improvement.

SUMMARY OF THE INVENTION

The present invention has been made in view of the above-described problem, and an object thereof is to provide an electrical connection box capable of easily perform positioning of a bus bar with respect to a lower cover and an upper cover.

An electrical connection box according to one aspect of the present invention includes a lower cover; an upper cover that closes an opening of the lower cover; a connector front opening provided in the lower cover or the upper cover; a bus bar that is accommodated in an internal space when the lower cover and the upper cover are assembled, is formed using a conductive plate-shaped member, and is connected to an external connector terminal by being arranged so as to be partially exposed from the connector front opening; at least four first ribs erected in the internal space of the lower cover and formed of two pairs opposing each other with the bus bar interposed therebetween; and at least four second ribs erected in the internal space of the upper cover and formed of two pairs opposing each other with the bus bar interposed therebetween, wherein a specific direction in a direction orthogonal to a direction of assembling the lower cover and the upper cover is set as a first direction, and a direction orthogonal to the first direction is set as a second direction, the first ribs and the second ribs are provided such that a pair of ribs is provided to oppose each other on one side and on another side with the bus bar interposed therebetween in the first direction, and a pair of ribs is provided to oppose each other on one side and on another side with the bus bar interposed therebetween in the second direction, and the first ribs and the second ribs are provided at different positions when viewed from the direction of assembling the lower cover and the upper cover.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Incidentally, the invention is not limited by the embodiment. In addition, constituent elements in the following embodiment include one that can be installed by a person skilled in the art or substantially the same one.

Embodiment

Figure 1:
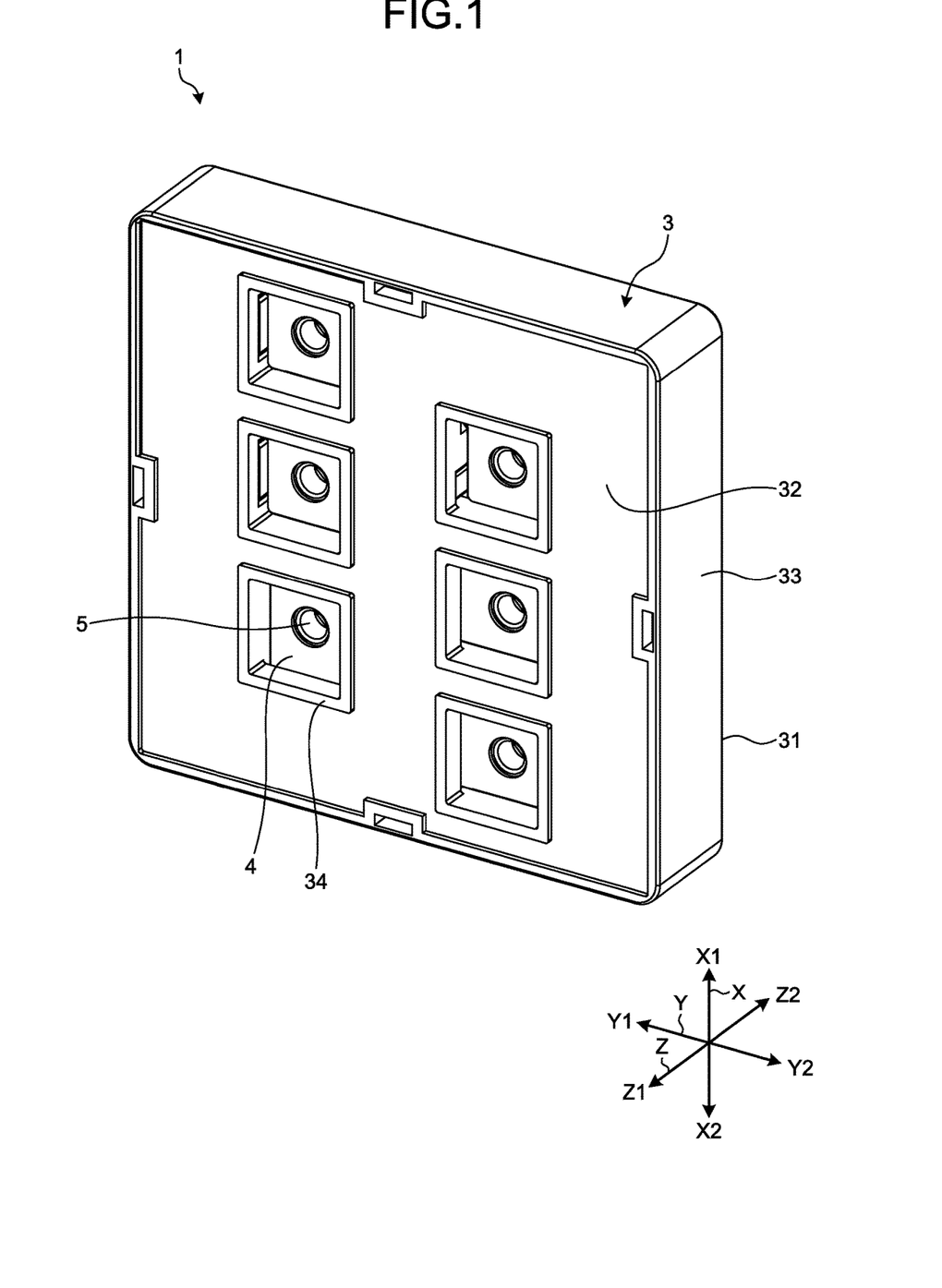
FIG. 1 is a perspective view of an electrical connection box according to an embodiment.
Figure 2:
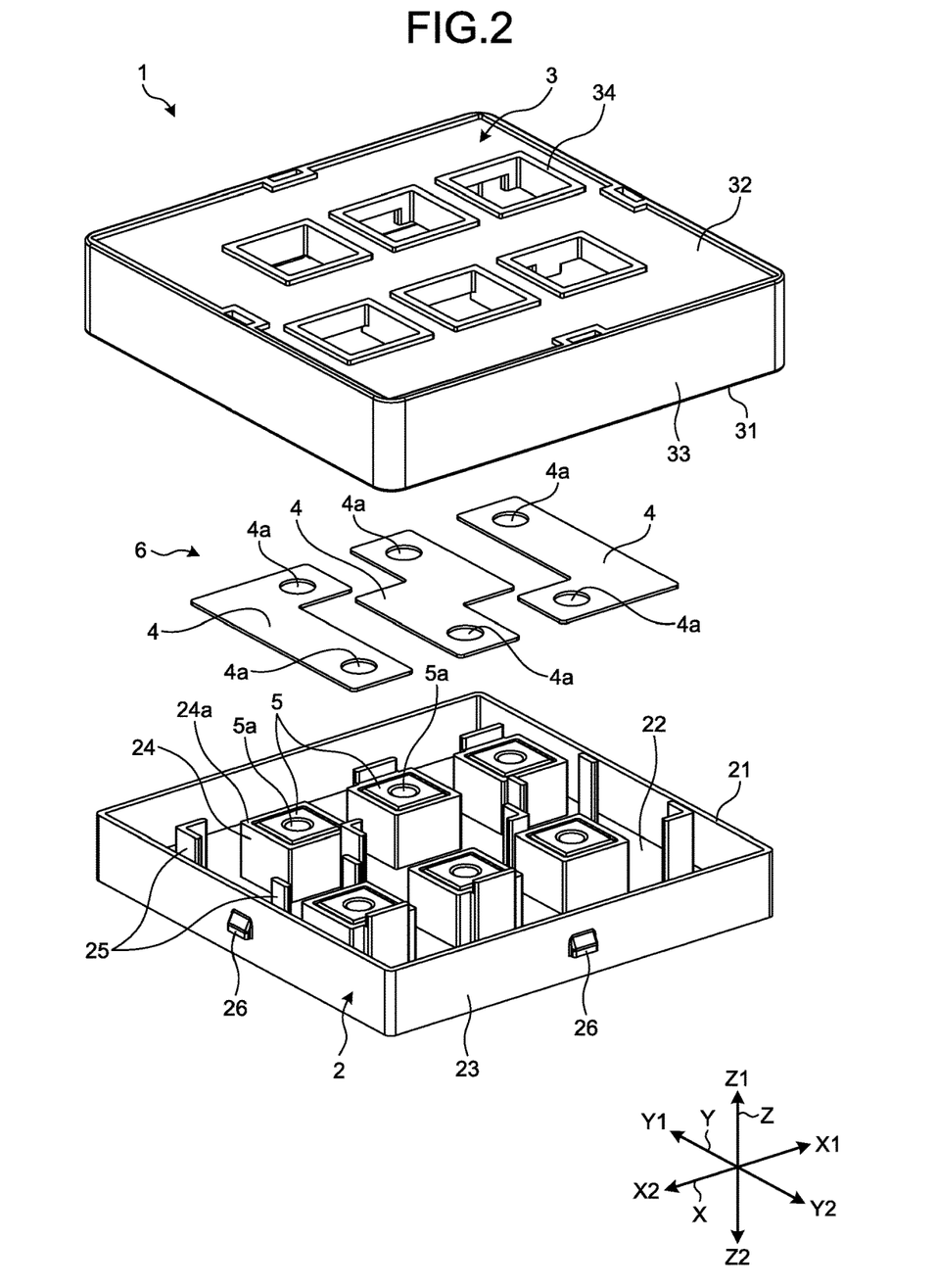
FIG. 2 is an exploded perspective view of the electrical connection box according to the embodiment.
Figure 3:
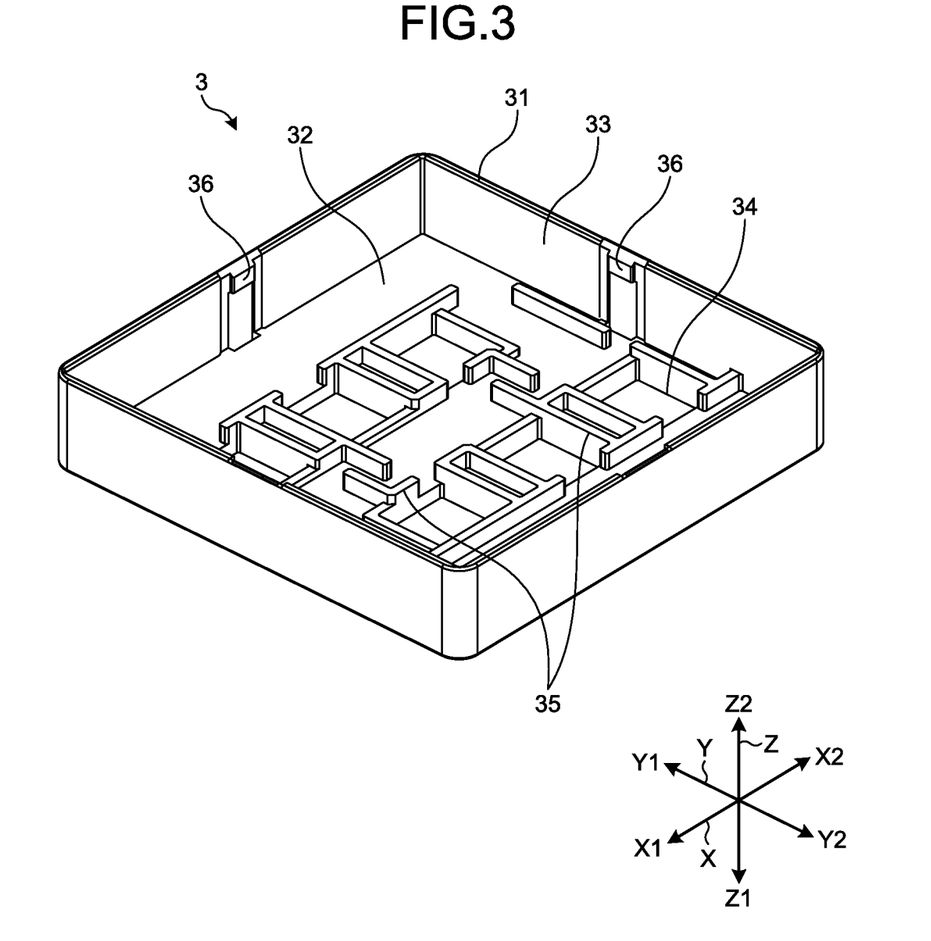
FIG. 3 is a perspective view of an upper cover according to the embodiment.
Figure 4:
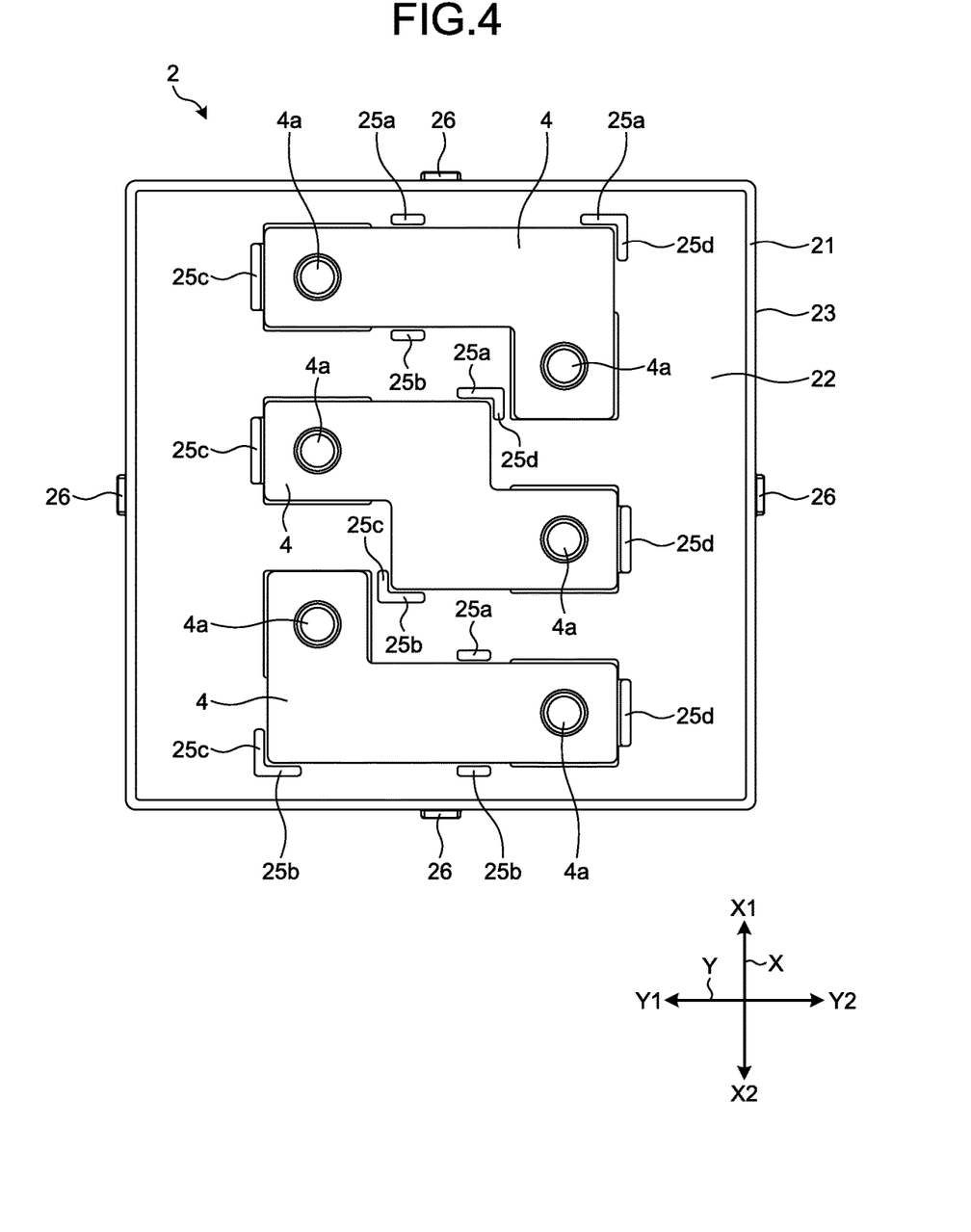
FIG. 4 is a top view of a lower cover holding a bus bar according to the embodiment.
Figure 5:
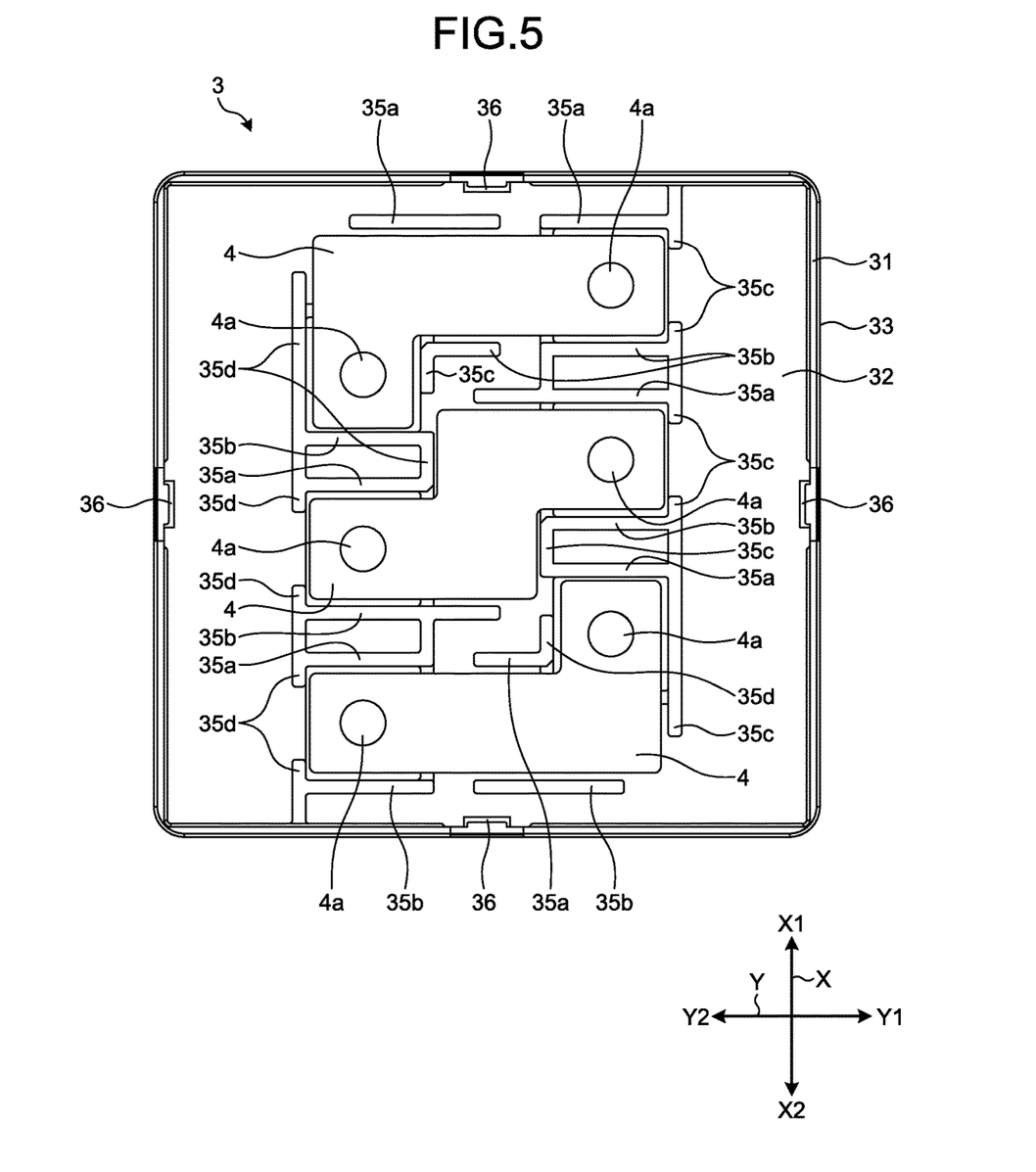
FIG. 5 is a bottom view of the upper cover holding the bus bar according to the embodiment.
Figure 6:
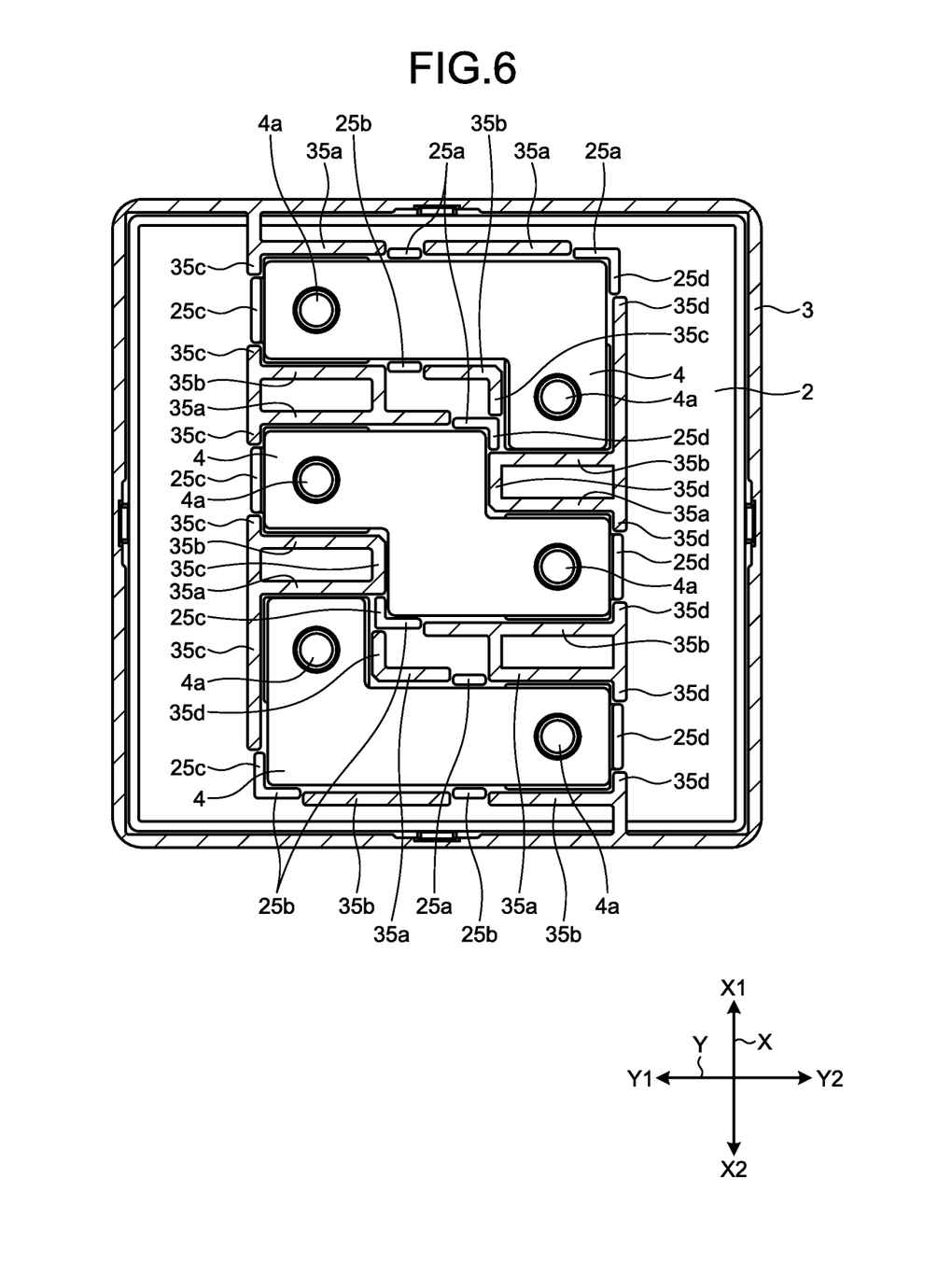
FIG. 6 is a cross-sectional view of the electrical connection box according to the embodiment.

An electrical connection box according to an embodiment will be described. FIG. 1 is a perspective view of the electrical connection box according to the embodiment. FIG. 2 is an exploded perspective view of the electrical connection box according to the embodiment. FIG. 3 is a perspective view of an upper cover according to the embodiment. FIG. 4 is a top view of a lower cover holding a bus bar according to the embodiment. FIG. 5 is a bottom view of the upper cover according to the embodiment. FIG. 6 is a cross-sectional view of the electrical connection box according to the embodiment.

An electrical connection box 1 according to the present embodiment is mounted on a vehicle such as an automobile and distributes electric power supplied from a power supply such as a battery to various electronic devices mounted on the vehicle via various electronic components or the like. The electrical connection box 1 is installed at a place that is exposed to external environment, for example, an engine room of the vehicle or the like, and is connected between the power supply and the various electronic devices. The electrical connection box 1 may constitute a wire harness together with an electric wire. The electrical connection box 1 is sometimes referred to as a junction box, a fuse box, a relay box, or the like depending on a type of an electronic component to be accommodated, and these terms will be collectively referred to as the "electrical connection box" in the present embodiment.

In the following description, an X direction in the drawing is a vertical direction of the electrical connection box 1 in the present embodiment, and is a first direction. Among the X directions, an X1 direction is an upward direction and an X2 direction is a downward direction. A Y direction in the drawing is a width direction of the electrical connection box 1 in the present embodiment, is a direction orthogonal to the vertical direction, and is a second direction. Among the Y directions, a Y1 direction is one direction and a Y2 direction is the other direction. A Z direction in the drawing is a thickness direction of the electrical connection box 1 in the present embodiment, is a direction orthogonal to the vertical direction and the width direction, and is a direction of assembling the lower cover 2 and the upper cover 3. Among the Z directions, a Z1 direction is a front direction and a Z2 direction is a depth direction.

The electrical connection box 1 of the present embodiment has a rectangular parallelepiped shape. As illustrated in FIG. 1 and the like, the electrical connection box 1 is configured to include a lower cover 2, an upper cover 3, a bus bar 4, a nut 5, a first rib 25, and a second rib 35. As illustrated in FIG. 2, the lower cover 2 and the upper cover 3 are engaged with each other to form an internal space 6 to accommodate the bus bar 4 and the nut 5.

The lower cover 2 is engaged with the upper cover 3 and forms the internal space 6 together with the upper cover 3. The lower cover 2 is formed using an insulating material such as a synthetic resin. The lower cover 2 of the present embodiment has a box shape and has an opening 21 at an end on a side of the front direction between both ends in the thickness direction. As illustrated in FIGS. 2 and 4, the lower cover 2 forms a bottom 22, a side wall 23, a nut holding portion 24, a first rib 25, and a locked portion 26.

The bottom 22 has a flat plate shape. The bottom 22 is formed with the side wall 23 that is erected from an outer circumference toward the front direction. The bottom 22 is formed with the nut holding portion 24 and the first rib 25 erected toward the front direction.

The side wall 23 is formed in a tubular shape when viewed from the thickness direction. An end of the side wall 23 on a side of the depth direction between both ends in the thickness direction is connected to the bottom 22, and the opening 21 is formed by an end on a side of the front direction. The locked portions 26 locked by locking portions 36 are formed, respectively, at portions of the side wall 23 corresponding to four sides constituting an outer circumferential surface.

The nut holding portion 24 holds the nut 5. The nut holding portion 24 is erected from the bottom 22 toward the front direction. Here, the nut holding portion 24 is formed on the depth direction side of the first rib 25 in the thickness direction, that is, formed to be lower than the first rib 25 as viewed from the bottom 22. The nut holding portion 24 is formed in a cylindrical shape and has an opening 24a so that the nut 5 can be inserted therethrough. The opening 24a of the nut holding portion 24 is in contact with a surface of the bus bar 4 on the depth direction side. The nut holding portion 24 of the present embodiment is provided such that two nut holding portions form one pair, and it is possible to place the single bus bar 4 with respect to the two nut holding portions 24.

The first rib 25 restricts a position of the bus bar 4 with respect to the lower cover 2 in an assembly state of the lower cover 2 and the upper cover 3, that is, an assembled state. The first rib 25 is composed of at least four first ribs 25a, 25b, 25c, and 25d formed of two pairs opposing each other with the bus bar 4 interposed therebetween. One pair corresponds to the first ribs 25a and 25b that oppose each other in the vertical direction, which is the first direction, and the first rib 25a is on a side of the upward direction and the first rib 25b is on a side of the downward direction. The other pair corresponds to the first ribs 25c and 25d that oppose each other in the width direction, which is the second direction, and the first rib 25c is on a side of the one direction and the first rib 25d is on a side of the other direction. When viewed from the vertical direction, a region surrounded by the first ribs 25a to 25d, that is, the region surrounded by the respective first ribs 25a to 25d by extending the first rib 25a and the first rib 25b in the width direction and extending the first rib 25c and the first rib 25d in the vertical direction is formed to be wider than the corresponding bus bar 4. Further, an interval in the vertical direction between one pair of the first ribs 25a and 25b is formed to be larger than a length in the vertical direction of the nut holding portion 24. Further, an interval in the width direction of the other pair of the first ribs 25c and 25d is formed to be larger than a length in the width direction of the nut holding portion 24. Here, each of the first ribs 25a to 25d may be present alone at the bottom 22, or two or more first ribs 25a to 25d may be connected. When the two or more first ribs 25a to 25d are connected, the substantial number of the first ribs 25 in the lower cover 2 can be reduced, and the strength of the first ribs 25 can be improved.

The upper cover 3 is engaged with the lower cover 2 and closes the opening 21 of the lower cover 2 to form the internal space 6. The upper cover 3 is formed using an insulating material such as a synthetic resin. The upper cover 3 of the present embodiment has a box shape and has an opening 31 at an end on the depth direction side between both ends in the thickness direction. The upper cover 3 forms a ceiling 32, a side wall 33, a connector front opening 34, a second rib 35, and the locking portion 36.

The ceiling 32 has a flat plate shape. The ceiling 32 is formed with the side wall 33 erected from an outer circumference toward the depth direction. The connector front opening 34 is formed on the ceiling 32. The second rib 35 erected toward the depth direction is formed on the ceiling 32.

The side wall 33 is formed in a tubular shape when viewed from the thickness direction. An end of the side wall 33 on the front direction side is connected to the ceiling 32 between both ends in the thickness direction, and the opening 31 is formed by an end in the depth direction side. Here, the opening 31 is formed to be wider than an outer circumference of the lower cover 2 when viewed from the thickness direction. The locking portions 36 by which the locked portions 26 are locked are formed, respectively, at portions of the side wall 33 corresponding to four sides constituting an outer circumferential surface.

The connector front opening 34 connects the bus bar 4 and an external connector terminal (not illustrated), and is arranged such that the bus bar 4 accommodated in the internal space 6 is exposed to the outside. The connector front opening 34 is formed to penetrate through the ceiling 32 in the thickness direction. In the assembled state, the connector front opening 34 is formed so as to oppose a through hole 4a, which will be described later, of the bus bar 4 and a screw hole 5a, which will be described later, of the nut 5 in the thickness direction. The connector front opening 34 in the present embodiment is formed such that two connector front openings form one pair to correspond to the single bus bar 4.

The second rib 35 restricts the position of the bus bar 4 with respect to the upper cover 3 in the assembled state. The second rib 35 is composed of at least four second ribs 35a, 35b, 35c, and 35d formed of two pairs opposing each other with the bus bar 4 interposed therebetween. One pair corresponds to the second ribs 35a and 35b that oppose each other in the vertical direction, which is the first direction, the second rib 35a is on a side of the upward direction and the second rib 35b is on a side of the downward direction. The other pair corresponds to the second ribs 35c and 35d that oppose each other in the width direction, which is the second direction, and the second rib 35c is on the one direction side and the second rib 35d is on the other direction side. When viewed from the vertical direction, a region surrounded by the second ribs 35a to 35d, that is, the region surrounded by the respective second ribs 35a to 35d by extending the second rib 35a and the second rib 35b in the width direction and extending the second rib 35c and the second rib 35d in the vertical direction is formed to be wider than the corresponding bus bar 4. Further, an interval in the vertical direction between one pair of the second ribs 35a and 35b is formed to be larger than a length in the vertical direction of the nut holding portion 24. Further, an interval in the width direction of the other pair of the second ribs 35c and 35d is formed to be larger than a length in the width direction of the nut holding portion 24. Here, each of the second ribs 35a to 35d may be present alone at the ceiling 32, or two or more second ribs 35a to 35d may be connected. When the two or more second ribs 35a to 35d are connected, the substantial number of the second ribs 35 in the upper cover 3 can be reduced, and the strength of the second ribs 35 can be improved.

Here, the first rib 25 and the second rib 35 are provided at different positions as the first rib 25 and the second rib 35 are viewed from the direction of assembling the lower cover 2 and the upper cover 3, that is, the thickness direction. In the present embodiment, the first ribs 25a to 25d and the second ribs 35a to 35d are formed so as not to overlap with each other when viewed from the thickness direction.

The bus bar 4 is accommodated in the internal space 6 in the assembled state, and is electrically connected to the external connector terminal. The bus bar 4 is formed using a conductive plate-shaped member such as copper. The bus bar 4 is formed, for example, by shearing and bending a metal plate, which is a base material, by a press machine or the like. As illustrated in FIGS. 2 and 4 to 6, the bus bar 4 of the present embodiment is formed in an L shape or an S shape when viewed from the thickness direction. In the assembled state, the bus bar 4 is sandwiched between the one pair of first ribs 25a and 25b, sandwiched between the other pair of first ribs 25c and 25d, sandwiched between the one pair of second ribs 35a and 35b, and sandwiched between the other pair of second ribs 35c and 35d. The bus bar 4 has the through hole 4a into which a screw member having been inserted into a through hole (not illustrated) of a connector terminal (not illustrated) can be inserted. A pair of the through holes 4a is formed at both ends in the width direction of the bus bar 4 of the present embodiment. That is, the bus bar 4 is arranged so as to be exposed from the connector front opening 34 at both the ends in the width direction, and is electrically connected to the external connector terminal.

The nut 5 is accommodated in the internal space 6 in the assembled state, and fastens the screw member which has been inserted into the through hole (not illustrated) of the external connector terminal and the through hole 4a of the bus bar 4. The nut 5 is formed into a rectangular parallelepiped shape and has the screw hole 5a to which the screw member is fastened. The nut 5 in the present embodiment is formed such that two nuts form one pair to correspond to the single bus bar 4.

Next, the assembly of the electrical connection box 1 will be described. First, the nut 5 is held by each of the nut holding portions 24 of the lower cover 2. Next, the bus bar 4 is accommodated with respect to the lower cover 2. Specifically, the respective bus bars 4 are assembled to the lower cover 2 by being placed on the corresponding pair of nut holding portions 24. At this time, each of the bus bars 4 is sandwiched between one pair of the first ribs 25a and 25b and sandwiched between the other pair of the first ribs 25c and 25d. Therefore, positioning of each of the bus bars 4 is performed with respect to the lower cover 2. Next, the upper cover 3 is assembled with the lower cover 2. Specifically, the upper cover 3 is arranged with respect to the lower cover 2 such that the opening 31 opposes the opening 21 of the lower cover 2 in the thickness direction, and the upper cover 3 is moved in the depth direction with respect to the lower cover 2. As a result, the lower cover 2 is covered with the upper cover 3, and the opening 21 is closed by the upper cover 3. At this time, each of the bus bars 4 positioned with respect to the lower cover 2 by the first ribs 25 is sandwiched between the one pair of second ribs 35a and 35b and sandwiched between the other pair of second ribs 35c and 35d. Therefore, the positioning of each of the bus bars 4 is performed with respect to the upper cover 3. Next, the screw member is inserted into the connector front opening 34 in the state of being inserted into the through hole of the external connector terminal. Next, the screw member that has been inserted into the connector front opening 34 is inserted into the through hole 4a of the bus bar 4. Next, the screw member is fastened to the nut 5 by screwing the screw member that has been inserted into the through hole 4a into the screw hole 5a of the nut 5. As a result, the external connector terminal and the bus bar 4 are electrically connected, power is supplied from the outside of the electrical connection box 1 to the bus bar 4, and power is supplied to another electronic device via the external connector terminal electrically connected to the same bus bar 4.

As described above, the first rib 25 and the second rib 35 can position each of the bus bars 4 with respect to the lower cover 2 and the upper cover 3 in the assembled state in the electrical connection box 1 of the present embodiment. In other words, since the positioning of the bus bar 4 with respect to the lower cover 2 and the upper cover 3 can be easily performed, it is possible to achieve cost reduction through space saving or simplification of a die without using a method of using an additional member for positioning the bus bar 4, an insert molding method, or a method of dividing a bus bar.

The connector front opening 34 is formed in the upper cover 3 in the electrical connection box 1 of the above-described embodiment, but the invention is not limited thereto, and the connector front opening 34 may be formed in the lower cover 2.

In addition, each of the bus bars 4 is assembled with the lower cover 2 in the electrical connection box 1 of the above-described embodiment, but the invention is not limited thereto, and each of the bus bars 4 may be assembled with the upper cover 3 first and then, the upper cover 3 may be assembled with the lower cover 2.

An electrical connection box according to the present embodiments achieves an effect that it is possible to easily perform the positioning of the bus bar with respect to the lower cover and the upper cover.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
   a lower cover;
   an upper cover that closes an opening of the lower cover;
   a connector front opening provided in the lower cover or the upper cover;
   a bus bar that is accommodated in an internal space when the lower cover and the upper cover are assembled, is formed using a conductive plate-shaped member, and is connected to an external connector terminal by being arranged so as to be partially exposed from the connector front opening;
   at least four first ribs erected in the internal space of the lower cover and formed of two pairs opposing each other with the bus bar interposed therebetween; and
   at least four second ribs erected in the internal space of the upper cover and formed of two pairs opposing each other with the bus bar interposed therebetween, wherein
   a specific direction in a direction orthogonal to a direction of assembling the lower cover and the upper cover is set as a first direction, and a direction orthogonal to the first direction is set as a second direction,
   the first ribs and the second ribs are provided such that a pair of ribs is provided to oppose each other on one side and on another side with the bus bar interposed therebetween in the first direction, and a pair of ribs is provided to oppose each other on one side and on another side with the bus bar interposed therebetween in the second direction, and
   the first ribs and the second ribs are provided at different positions when viewed from the direction of assembling the lower cover and the upper cover.

* * * * *